United States Patent [19]

Andrus et al.

[11] Patent Number: 4,494,865

[45] Date of Patent: Jan. 22, 1985

[54] PROVIDING PATTERNS

[75] Inventors: Paul G. Andrus, Powell; B. Thomas Smith, Upper Arlington; Thomas M. Dolash, Worthington, all of Ohio

[73] Assignee: Battelle Development Corporation, Columbus, Ohio

[21] Appl. No.: 449,365

[22] Filed: Dec. 13, 1982

[51] Int. Cl.[3] .................... G03B 27/32; G03B 27/52

[52] U.S. Cl. .................................... 355/32; 355/77; 358/75; 358/300; 430/44

[58] Field of Search ...................... 355/4, 32, 33, 77; 358/75, 300; 430/8, 31, 32, 42, 44, 56, 62, 106, 111, 900

[56] References Cited

U.S. PATENT DOCUMENTS

| | | | |
|---|---|---|---|
| 2,480,848 | 9/1949 | Geer | 250/164 |
| 2,481,839 | 9/1949 | Goldsmith | 178/5.4 |
| 2,544,690 | 3/1951 | Koch et al. | 250/164 |
| 3,706,559 | 12/1972 | Sprague | 96/48 PD |
| 3,780,214 | 12/1973 | Bestenreiner et al. | 178/5.2 R |
| 3,855,928 | 12/1974 | Kinney et al. | 101/471 |
| 4,012,776 | 3/1977 | Mrdjen et al. | 358/75 |
| 4,234,250 | 11/1980 | Mailloux et al. | 355/4 |
| 4,286,031 | 8/1981 | Kuehnle et al. | 430/44 |

OTHER PUBLICATIONS

E. W. Herold, Methods Suitable For Television Color Kinescopes; Proc. I.R.E., 39, 1177–1185, Oct. 1951, pp. 1177 and 1183–1185.

*Primary Examiner*—Richard A. Wintercorn
*Attorney, Agent, or Firm*—Philip M. Dunson

[57] ABSTRACT

Apparatus and methods for providing patterns of materials, as for color printing. A support member (30) has groups of surface areas (40A,40B, etc.) with each surface area in a given group (e.g. 40A) facing generally in a direction different from that faced by the surface areas in any other group (e.g. 40B, etc.), and an energy-modifiable material (41A,41B, etc.) adjacent to the surface areas in each group. Energy (A,B,C) is directed onto the material adjacent to the surface areas in each group in such manner as to substantially modify some of the material without substantially modifying the material adjacent to the surface areas of the other groups. A receiver member (32) may be positioned with a surface (31) thereof adjacent to the groups of surface areas; and a substantial proportion either of the modified materials or of the remaining unmodified materials may be transferred to the receiver surface (31) to form the desired patterns thereon, or electromagnetic radiation (A,B,C) may be directed to the patterns formed by the modified materials and be modulated thereby to project images on the receiver surface (31).

38 Claims, 22 Drawing Figures

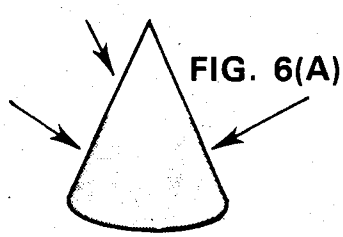
FIG. 6(A)
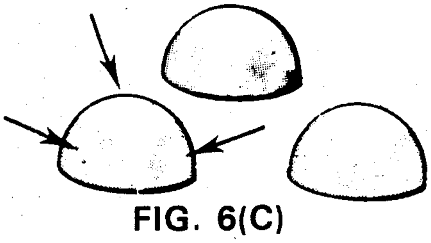
FIG. 6(C)
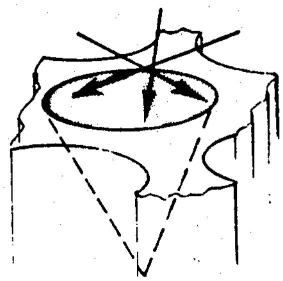
FIG. 6(B)
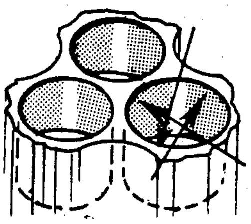
FIG. 6(F)
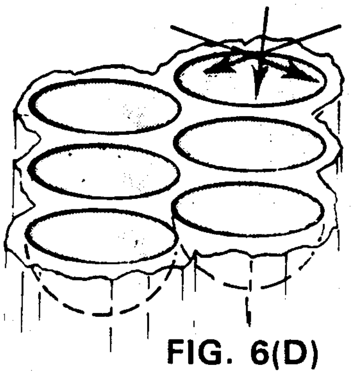
FIG. 6(D)
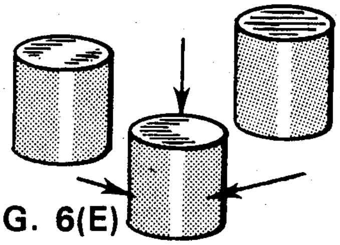
FIG. 6(E)
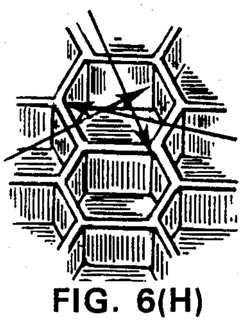
FIG. 6(H)
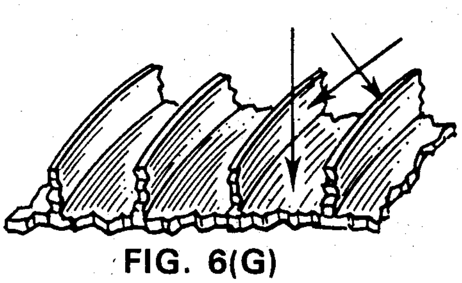
FIG. 6(G)
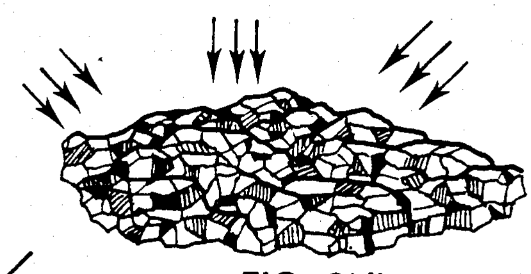
FIG. 6(J)
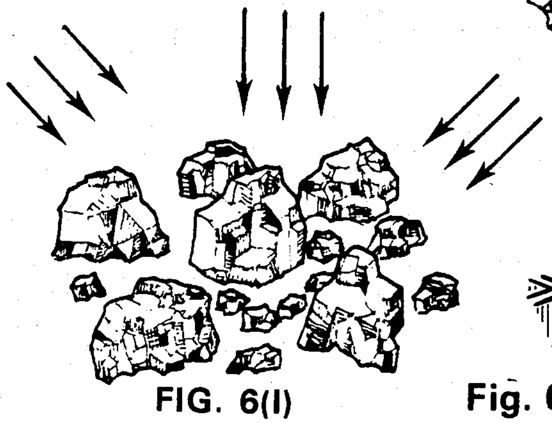
FIG. 6(I)
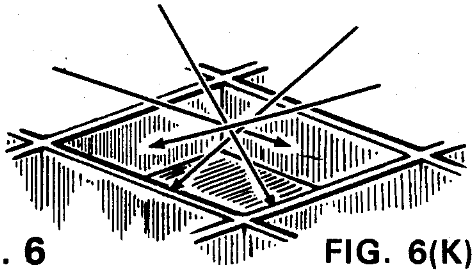
FIG. 6(K)
Fig. 6

PROVIDING PATTERNS

FIELD

This invention relates to methods and apparatus for providing patterns of materials. It is especially useful for printing in a plurality of colors.

BACKGROUND

Technologies for producing color hard copy of computer graphics include impact, ink jet, photographic, electrographic, thermal, and pen plotters.

Impact printer/plotters typically use a multicolor ribbon which is struck with hammers in a typewriter-like fashion. A single color is printed for a line or page, the next color is printed for the same line or page, and so on. Major disadvantages of this technology are noise, difficulties in achieving the necessary registration between colors, and a lack of color selection. For example, a printer/plotter using the primary colors of cyan, magenta, and yellow can only produce the additional colors of red, green, blue, and black. No gray scale is possible. Color impact printer/plotters tend to be rather slow (3-5 minutes per print) and have poor resolution.

Ink jet printer/plotters use either a continuous flow of charged droplets, which are electrostatically deflected toward or away from the printing surface, or piezoelectric transducers, which produce a single droplet on demand. Print heads have several nozzles to print in several colors substantially simultaneously. Ink jet printer/plotters that can print in many colors (i.e. each color modulated some number of steps rather than simple on/off) are expensive. Considerable assembly of mechanical parts is required during manufacture. With only intermittent use, the inks may tend to dry out and clog the nozzles.

Photographic systems use panchromatic film to capture images from a cathode ray tube (CRT) or are laser exposed. The former typically use a monochrome CRT with a set of color filters to expose the film. Instant color films are expensive. Conventional laboratory-processed color films are less expensive, but have the inherent processing turnaround time as a disadvantage.

Electrographic systems include those using styli to deposit electrostatic charge patterns on dielectric paper and those using lasers to discharge photoconductors (laser xerography). The charge patterns in either case are subsequently developed with colored toners in sequence. Disadvantages include the necessity of multiple registrations, high failure rate, and high purchase price and maintenance costs.

Thermal printer/plotters heat small areas on a dye-laden sheet, web, or ribbon. The dye is transferred to the receiver as a result of the heat. Because each color is printed serially, either per line or per page, multiple registrations are required.

Pen plotters typically write on plain paper or a transparent material with felt-tip pens. The technology is mature, but the plotters are very slow and colors are limited to the available pens. Filling in large areas of color is extremely time consuming.

Apparatus according to the present invention can be designed to replace the various types of equipment mentioned above, with advantages such as lower cost, faster operation, better registration, and generally improved quality.

The apparatus is extremely low cost because it produces full color prints in a single pass; multiple registration is not required. Each field of primary color information is written independently and simultaneously with a single type of optical beam (e.g. laser diode). Color crosstalk is eliminated by proper orientation of colorant surfaces and propagation direction of the beams.

Typical apparatus according to the present invention for providing patterns of materials, comprises a support member having a plurality of groups of surface areas, with each surface area in a given group facing generally in a predetermined direction that is different from the direction faced by the surface areas in any other group, the surface areas in each group having thereon an energy-modifiable material adjacent thereto, and means for directing energy onto the surface areas in each group in such manner as to substantially modify some of the material without substantially modifying the material adjacent to the surface areas of the other groups.

Typically the material adjacent to the surface areas of one group differs from the material adjacent to the surface areas of another group. Or the same material may be provided adjacent to the surface areas of all groups. Typically the material is substantially evenly distributed adjacent to the surface areas.

The apparatus may comprise also means for positioning a receiver member with a surface thereof adjacent to the groups of surface areas, so as to transfer a substantial proportion either of the modified materials or of the remaining unmodified materials to the receiver surface to form the desired patterns thereon. In some typical embodiments of the invention, the receiver member, at and adjacent to the surface areas, is substantially transparent to the energy, and the energy is directed through the receiver member onto the material. In some other typical embodiments, the support member, at and adjacent to the surface areas, is substantially transparent to the energy, and the energy is directed through the support member onto the material.

Where the apparatus provides patterns requiring treatment to give the desired final patterns, it typically comprises also means for providing the required treatment. For example, apparatus providing a latent image may further comprise means for developing the image. It may comprise also means for fixing the developed image.

In some typical embodiments of the apparatus, the member has two groups of parallel surface areas forming an array of successive (and typically approximately right-angled) grooves, the right sides of the grooves being one group of surface areas, and the left sides of the grooves being the other group of surface areas.

In other typical embodiments, the member has three groups of surface areas approximately perpendicular to each other, forming an array of corners in rows and columns; each corner comprising three contiguous approximately perpendicular surface areas, one from each group, and approximating a corner of a cube; the first corresponding surface areas at the corners being parallel to one another and making up the first group, the second corresponding surface areas at the corners being parallel to one another and making up the second group, and the third corresponding surface areas at the corners being parallel to one another and making up the third group.

In still other typical embodiments, the member has four groups of surface areas forming an array of corners in rows and columns; each corner comprising four contiguous surface areas, one from each group, and approximating the vertex of a square-based pyramid; the first corresponding surface areas at the corners being parallel to one another and making up the first group, the second corresponding surface areas at the corners being parallel to one another and making up the second group, the third corresponding surface areas at the corners being parallel to one another and making up the third group, and the fourth corresponding surface areas at the corners being parallel to one another and making up the fourth group. The surface areas in other useful embodiments of the apparatus may comprise portions of conical, spherical, cylindrical, finned, vaned, or other depressed, protruding, or textured surfaces, regular or irregular; or combinations thereof; in regular or irregular disposition.

Typically the energy is spatially modulated to define the patterns of materials to be provided. The energy may be directed onto all groups simultaneously, or it may be directed onto the groups in sequence.

Each point in the energy pattern may be directed substantially simultaneously onto the surface areas of a group, or the energy may be directed onto the surface areas in beams or sheets that are scanned to cover a substantial part of the groups of surfaces; with each beam or sheet striking an entire surface area (or more) or a part thereof, as determined by the size of the beam or sheet. Typically each beam or sheet of energy scans the surface areas of a different group, and is modulated while it scans the surface areas. The energy directed onto the surface areas may comprise a combination of beams, sheets, and/or patterns. Typically the energy is directed onto the surface areas in each group in a direction predominantly normal thereto; and the energy comprises light or other electromagnetic radiation (as from a laser or a flash tube) that is modulated to define the patterns of materials to be provided. Suitable types of modulation include amplitude modulation and pulse-width modulation.

To form color patterns, the materials typically comprise colorants, dyes, pigments, or precursors thereof. Typically the materials comprise sublimable colorants, and the energy comprises electromagnetic radiation having wavelengths in the absorption bands of the materials, to sublimate the materials. In some typical embodiments of the invention, each material comprises a sublimable colorant in contact with an energy absorbent, and the energy directing means provides radiation of a wavelength in the absorption band of the energy absorbent, to heat it and thus to sublimate the colorant. In other typical embodiments, the material is a colorant in contact with a chemical reagent, and the energy directing means stimulates a chemical reaction that alters the state of the colorant.

In some typical embodiments of the invention, the surface areas of all groups have the same material adjacent thereto; and typically the patterns produced in the modified material are such as to be usable for subsequent modulation of energy. Typically means are included for directing electromagnetic radiation to the patterns, so as to be modulated thereby. Also typically included are means for projecting images responsive to the modulated radiation, and a radiation sensitive member positioned to receive the projected images. The radiation typically comprises light, and the sensitive member typically comprises materials responsive thereto for providing images in a plurality of colors. Some typical apparatus includes means for directing chemical reagents to the patterns, and the patterns modulate the flow of the reagents to form images responsive thereto. Other typical apparatus includes means for providing electric and/or magnetic fields in a region including the patterns, and the patterns modulate the fields to form images responsive thereto.

A typical method according to the present invention for providing patterns of materials, comprises providing a support member having a plurality of groups of surface areas, with each surface area in a given group facing generally in a predetermined direction that is different from the direction faced by the surface areas in any other group, providing an energy-modifiable material adjacent to the surface areas in each group, and directing energy onto the material adjacent to the surface areas in each group in such manner as to substantially modify some of the material without substantially modifying the material adjacent to the surface areas of the other groups. The method may comprise also positioning a receiver member with a surface thereof adjacent to the groups of surface areas, and transferring a substantial proportion either of the modified materials or of the remaining unmodified materials to the receiver surface to form the desired patterns thereon. Or the method may include positioning a receiver member with a surface thereof adjacent to the patterns of modified materials, and directing electromagnetic radiation to the patterns, in such manner as to be modulated thereby.

DRAWINGS

FIG. 6 is a collection of perspective views, FIGS. 6(A) through 6(K), of alternative shapes for surface areas in apparatus according to the invention.

Figure 8:
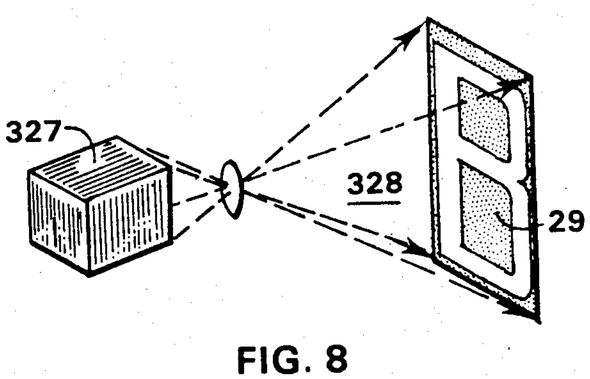
Figure 9:
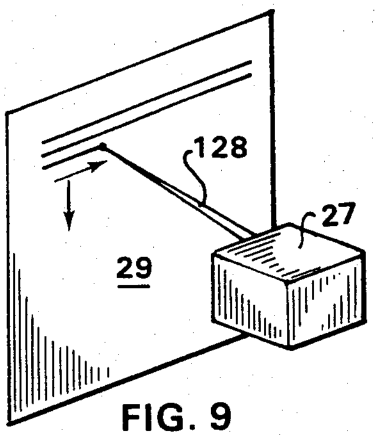
Figure 10:
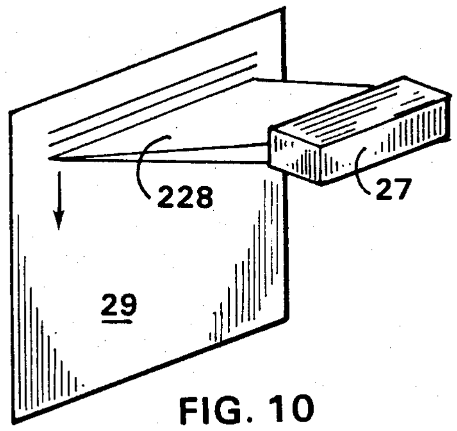

FIGS. 8, 9, and 10 are perspective views illustrating some alternative features in apparatus according to the invention.

Figure 11:
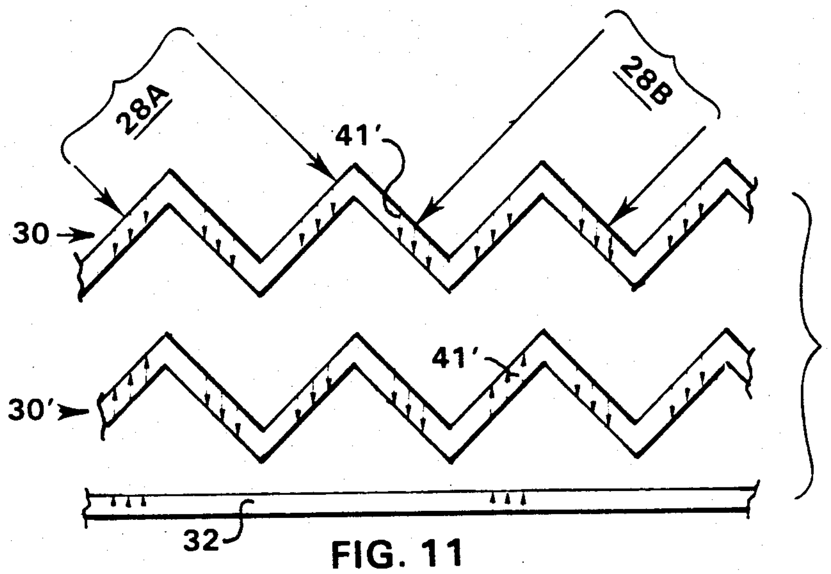
Figure 12:
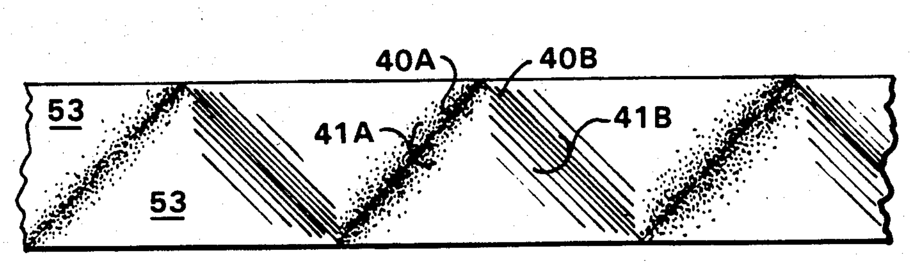

FIGS. 11 and 12 are cross-sectional views illustrating features of some other typical embodiments.

All of the figures are at least partly schematic.

CARRYING OUT THE INVENTION

Figure 1:
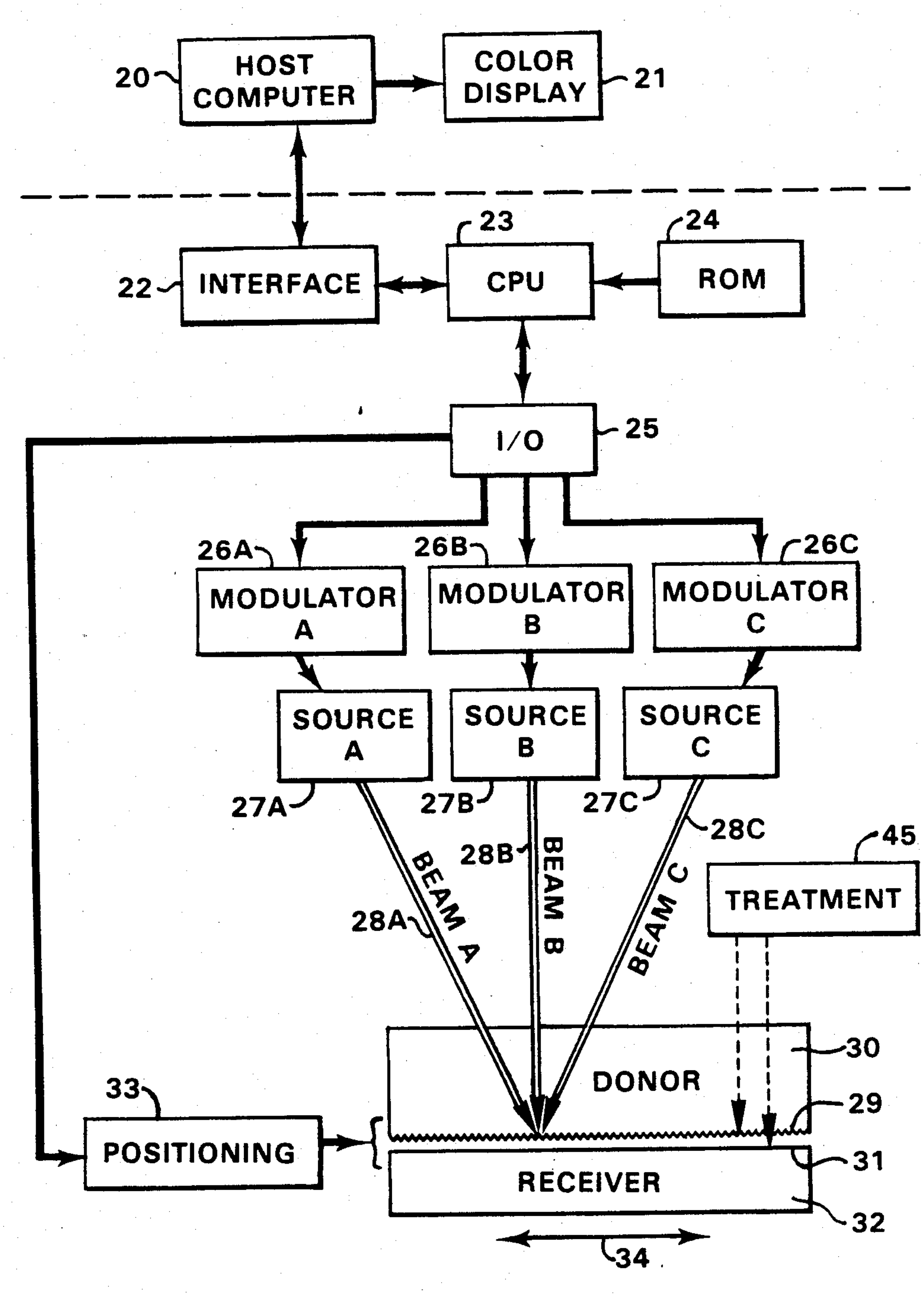
FIG. 1 is a block diagram of a typical color printing system comprising apparatus according to the present invention.

FIG. 1 illustrates a typical installation employing the present invention for printing in a plurality of colors. An operator's control and display terminal is shown above the dashed line as comprising a host computer 20, typically a digital minicomputer or microcomputer, and a display 21, which typically comprises a cathode ray tube capable of providing images in a full range of colors. For convenience, the operator's terminal typically is located remote from the apparatus shown below the dashed line.

The host computer 20 is connected by way of an interface unit 22 with a central processing unit 23, to which is connected a read-only memory 24 in which are stored the programs used in controlling the apparatus shown below the central processing unit 23 and connected therewith by way of an input/output coupling unit 25.

The coupling unit 25 provides to the apparatus shown below it the signals required to control the operation of the apparatus, and provides to the apparatus shown above it the signals needed to record and display the various conditions involved in the operation of the apparatus.

The first main function of the coupling unit 25 is to provide the signals for controlling three modulators 26A,26B,26C, separately, which are connected to three energy sources 27A,27B,27C, respectively, to control their respective output beams 28A,28B,28C.

The energy beams 28A,28B,28C are directed onto areas of a surface 29 on a donor member 30, which is located adjacent to a surface 31 on a receiver member 32.

The coupling unit 25 furnishes control signals also to a positioning unit 33, which controls the position of the donor member surface 29 relative to the energy beams 28A,28B,28C, as is indicated by the arrow 34. Typically the receiver member 32 is attached to the donor member 30 during the operation of the apparatus, and the two members 30,32 thus move together.

Referring now to all of the drawings, typical apparatus according to the present invention for providing patterns of materials comprises a support member 30 having a plurality of groups of surface areas 40A,40B, etc, with each surface area in a given group (e.g. 40A) facing generally in a predetermined direction that is different from the direction faced by the surface areas in any other group (e.g. 40B, etc), the surface areas in each group having an energy-modifiable material 41A,41B, etc adjacent thereto, and means 27A,27B, etc for directing energy A,B,C onto the surface areas 40A,40B, etc in each group (e.g. 40A) in such manner as to substantially modify some of the material without substantially modifying the material adjacent to the surface areas of the other groups (e.g. 40B, etc).

Figure 2:
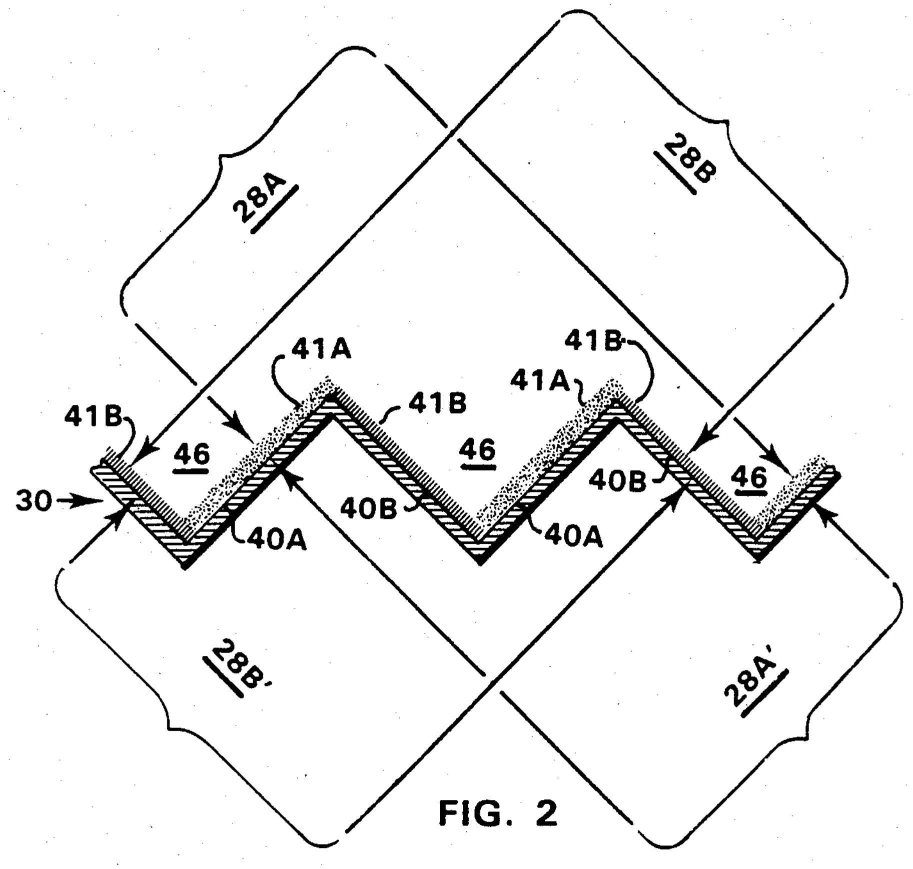
FIG. 2 is a cross-sectional view illustrating the principal features of a typical embodiment of the invention.

Typically the material 41A adjacent to the surface areas of one group 40A differs from the material 41B adjacent to the surface areas of another group 40B, as in FIG. 2. Or the same material 41' may be provided adjacent to the surface areas of all groups 40A,40B, etc, as in FIG. 7. Typically the material 41',41A, etc is substantially evenly distributed adjacent to the surface areas 40A, etc. Protective coatings may be used on the material 41',41A, etc where necessary or desirable.

Except where the context clearly indicates a narrower usage, the terms "surface", "surface area", etc are intended herein to have their broad connotations, e.g. "surface" includes not only its more familiar meanings, such as "1.a. The outer or the topmost boundary of an object. b. A material layer constituting such a boundary.", but also its typical meanings in geometry, such as "2. Geometry. a. The boundary of any three-dimensional figure. b. The two-dimensional locus of points located in three-dimensional space whose height z above each point (x,y) of a region of a coordinate plane is specified by a function f(x,y) of two arguments." *The American Heritage Dictionary of the English Language*, William Morris, Editor, 1970. Surfaces and surface areas in the apparatus of this invention may be smooth, rough, textured, etc.

The apparatus may comprise also means 33 for positioning a receiver member 32 with a surface 31 thereof adjacent to the groups of surface areas 40A,40B, etc, so as to transfer a substantial proportion either of the modified materials 41A,41B, etc or of the remaining unmodified materials 41A,41B, etc to the receiver surface 31 to form the desired patterns thereon. In apparatus wherein the receiver member 32, at and adjacent to the surface areas 40A,40B, etc, is substantially transparent to the energy, as in FIG. 7, the energy 28A',28B' may be directed through the receiver member 32 onto the material 41'(41A,41B, etc). In apparatus wherein the support member 30, at and adjacent to the surface areas 40A,40B, is substantially transparent to the energy, as in FIG. 2, the energy may be directed through the support member 30 onto the surface areas 40A,40B, and thus onto the materials 41A,41B, as is indicated for the beams of energy 28A',28B' in FIG. 2.

Where the apparatus provides patterns requiring treatment to give the desired final patterns, it typically comprises also means 45 for providing the required treatment. For example, apparatus providing a latent image may further comprise means 45 for developing the image. It may comprise also means 45 for fixing the developed image.

Figure 3:
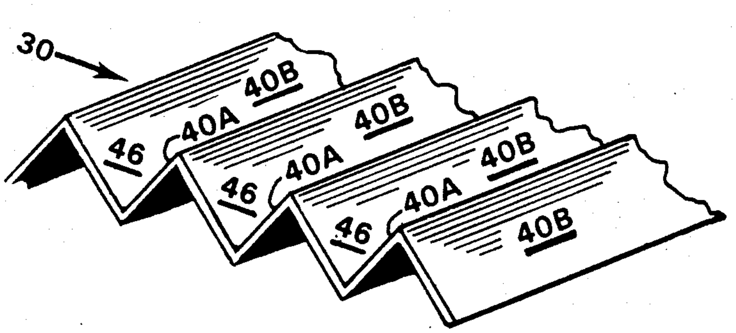
FIG. 3 is a perspective view of a portion of an embodiment as in FIG. 2.

As in FIGS. 2 and 3, in some typical embodiments of the apparatus, the member 30 has two groups of parallel surface areas 40A,40B forming an array of successive (and typically approximately right-angled) grooves 46, the right sides of the grooves 46 being one group of surface areas 40A, and the left sides of the grooves 46 being the other group of surface areas 40B.

Figure 4:
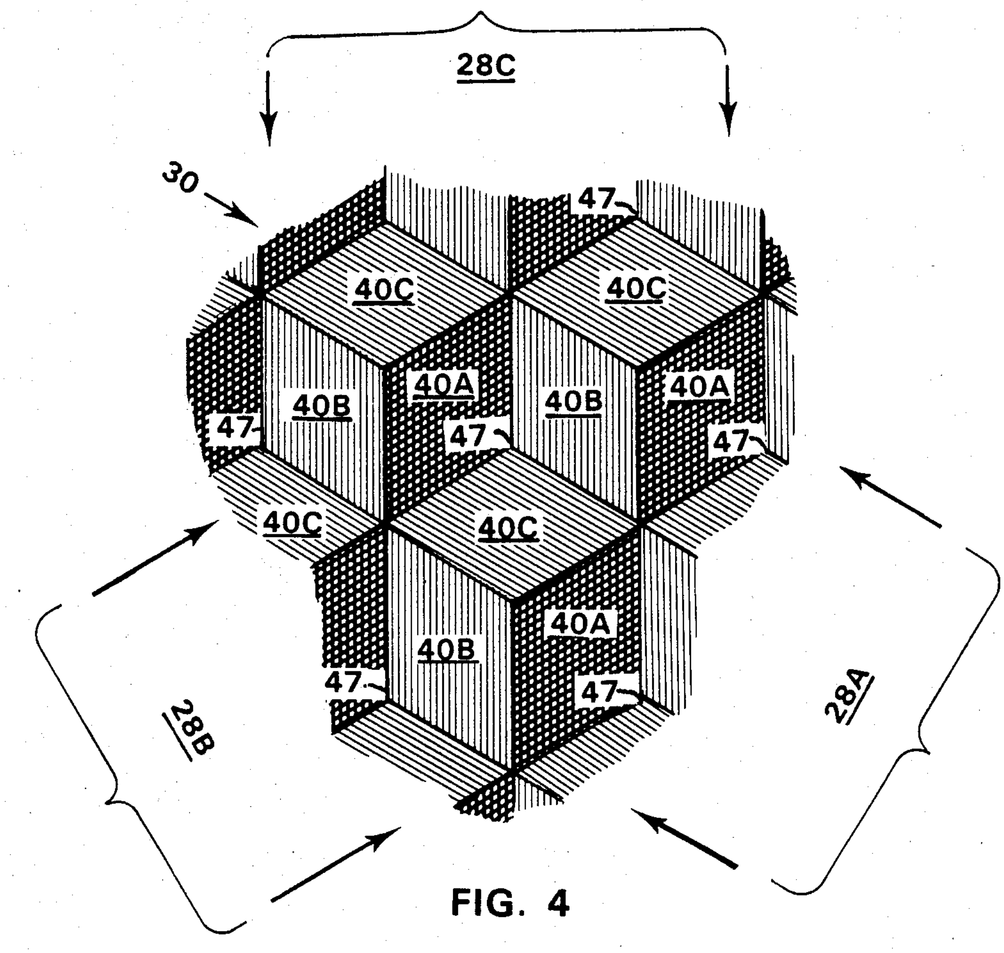
FIG. 4 is a plan view of a portion of another typical embodiment of the invention.

In other typical embodiments, as in FIG. 4, the member 30 has three groups of surface areas 40A,40B,40C approximately perpendicular to each other, forming an array of corners 47 in rows and columns; each corner 47 comprising three contiguous approximately perpendicular surface areas 40A,40B,40C, one from each group, and approximating a corner of a cube; the first corresponding surface areas 40A at the corners 47 being parallel to one another and making up the first group, the second corresponding surface areas 40B at the corners 47 being parallel to one another and making up the second group, and the third corresponding surface areas 40C at the corners 47 being parallel to one another and making up the third group.

Figure 5:
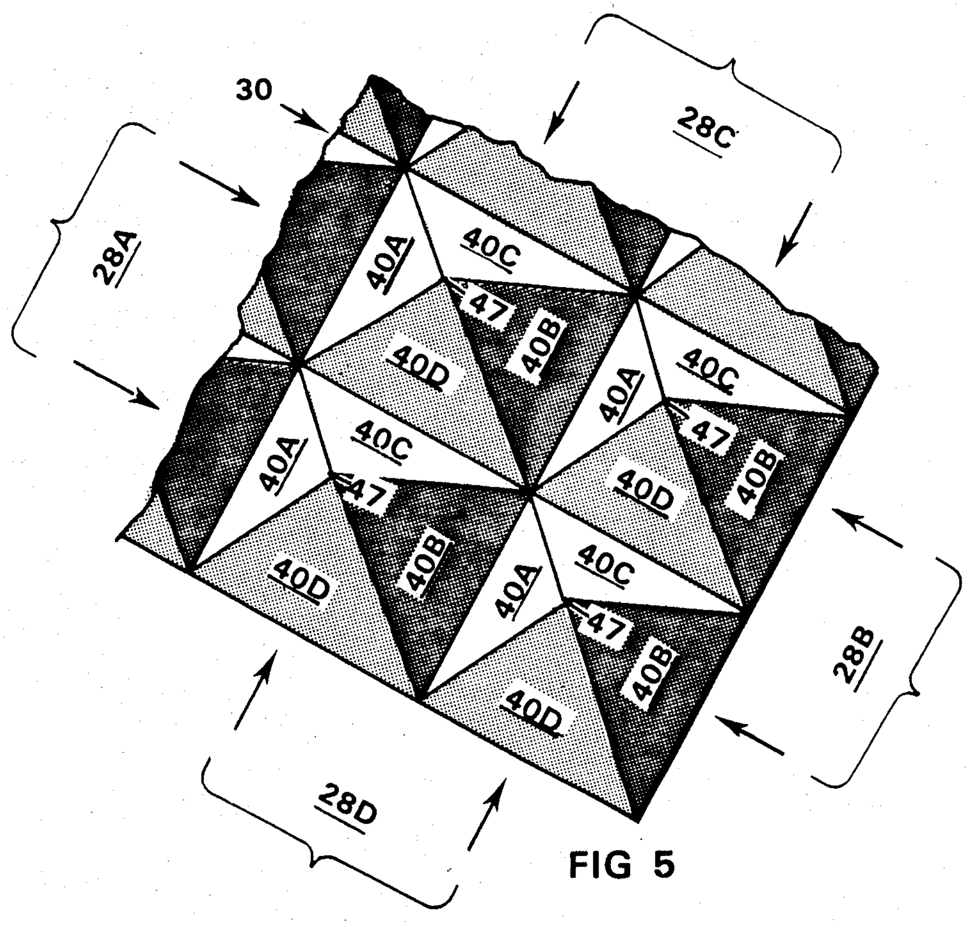
FIG. 5 is a plan view of a portion of still another typical embodiment.

In still other typical embodiments, as in FIG. 5, the member 30 has four groups of surface areas 40A,40B,40C,40D forming an array of corners 47 in rows and columns; each corner 47 comprising four contiguous surface areas 40A,40B,40C,40D, one from each group, and approximating the vertex of a square-based pyramid; the first corresponding surface areas 40A at the corners 47 being parallel to one another and making up the first group, the second corresponding surface areas 40B at the corners 47 being parallel to one another and making up the second group, the third corresponding surface areas 40C at the corners 47 being parallel to one another and making up the third group, and the fourth corresponding surface areas 40D at the corners 47 being parallel to one another and making up the fourth group.

As in FIG. 6, the surface areas in other useful embodiments of the apparatus may comprise portions of conical 6(A),(B), spherical 6(C),(D), cylindrical 6(E),(F), finned 6(G), vaned (6G), or other (e.g. 6(H),(I)) depressed 6(B),(D),(F),(H), protruding 5(A),(C),(E),(G),(I), or textured 6(J) surfaces, regular 6(A)-(H) or irregular 6(I),(J); or combinations thereof; in regular 6(A-)-(H) or irregular 6(I),(J) disposition.

Typically the energy 28A,28B, etc is spatially modulated, as in FIG. 8, to define the patterns of materials 41′,41A,41B, etc to be provided. The energy may be directed onto all groups simultaneously, or it may be directed onto the groups in sequence.

Each point in the energy pattern 28A,28B, etc may be directed substantially simultaneously as projected light images focused onto the surface areas (e.g. 40A) of a group, as in FIG. 8, or, where so desired, the energy may be directed onto the surface areas in narrow beams 128 or sheets 228 that are scanned to cover a substantial part of the groups of surfaces; as in FIG. 9 or 10, with each beam 28A,28B, etc, or 128 (FIG. 9) or each sheet 228 (FIG. 10) striking an entire surface area 40A,40B, etc (or more) or a part thereof, as determined by the size of the beam 128 or sheet 228. Typically each beam or sheet of energy 28A,28B,128,228, etc scans the surface areas 40A,40B, etc of a different group, and is modulated while it scans the surface areas. The energy 28A,28B, etc directed onto the surface areas 40A,40B, etc may comprise a combination of beams 128, as in FIG. 9, sheets 228, as in FIG. 10, and/or patterns 328, as in FIG. 8. Typically the energy 28A,28B, etc is directed onto the surface areas 40A,40B, etc in each group in a direction predominantly normal thereto, as is shown best in FIG. 2; and the energy 28A,28B, etc comprises light or other electromagnetic radiation (as from a laser or a flash tube) that is modulated to define the patterns of materials to be provided. Suitable types of modulation include amplitude modulation and pulse-width modulation.

To form color patterns, the materials 41A,41B, etc typically comprise colorants, dyes, pigments, or precursors thereof. Typically the materials 41A,41B, etc comprise sublimable colorants such as the dyes used in transfer printing processes, and the energy comprises light beams 28A,28B, etc having wavelengths in the absorption bands of the materials, to sublimate the materials. In some typical embodiments of the invention, each material 41A,41B, etc comprises a sublimable colorant such as American Hoechst Corporation's He-303 Fat Red 5B or He-500 Fat Blue in contact with an energy absorbent such as carbon black or gold black, and the energy directing means 27A,27B, etc provides radiation of a wavelength in the absorption band of the energy absorbent, to heat it and thus to sublimate the colorant. In other typical embodiments, each material 41A,41B, etc is a colorant in contact with a chemical reagent, and the energy directing means 27A,27B, etc stimulates a chemical reaction that alters the state of the colorant 41A,41B, etc.

Figure 7:
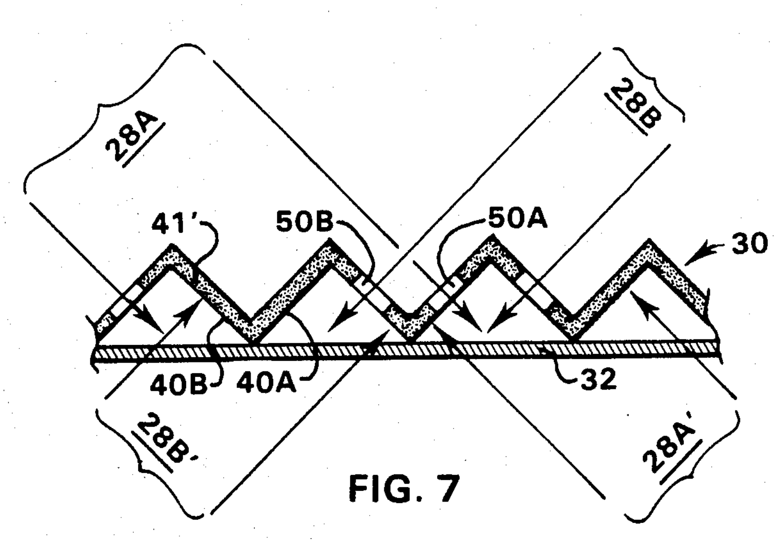
FIG. 7 is a cross-sectional view illustrating features of some typical embodiments of the invention.

In some typical embodiments of the invention, the surface areas of all groups 40A,40B, etc have the same material 41′ adjacent thereto as in FIG. 7; and typically the patterns produced in the modified material are such as to be usable for subsequent modulation of energy. Typically means 27A,27B, etc are included for directing electromagnetic radiation 28A,28B, etc to the patterns, so as to be modulated thereby. Also typically included are means 327 for projecting images responsive to the modulated radiation as in FIG. 8, and a radiation sensitive member 32 positioned to receive the projected images. The radiation 28A,28B, etc typically comprises light, and the sensitive member 32 typically comprises materials responsive thereto for providing images in a plurality of colors. Some typical apparatus includes means for directing chemical reagents 28A,28B, etc to the patterns, and the patterns include regions where material has been removed, or reduced in thickness, as at 50A and 50B in FIG. 7, so as to modulate the flow of the reagents to form images responsive thereto. In other typical apparatus, as in FIG. 11, the materials 41′ comprise particles of iron or other magnetic compositions, and means are included for providing magnetic fields in regions including the patterns, and the patterns modulate the fields to form images responsive thereto. The modified magnetic member 30′ may also be used as in FIG. 8 to modulate light (e.g. by the Faraday effect) to form color images on a receiver such as a magnetic film 32. Faraday rotation is a common optical modulation technique. In somewhat similar ways, as in FIG. 11, electric charges or electric dipoles may be induced on, or removed from, materials in which the charge or dipole can be varied, to provide patterns for modulating electric fields to form images responsive thereto on a receiver such as an electret 32. In the upper part of FIG. 11, the member 30 is shown with its dipoles or charges the same throughout, as they typically are before a pattern is formed. In the lower part, the modified member 30′ is shown with some of its dipoles or charges changed according to the pattern provided to it.

In one type of embodiment a three-group transparent support member 30, as in FIG. 4, is coated with a photosensitive material. The three groups of surface areas 40A,40B,40C are exposed to three separate images that result from either a photographic color separation or the red-blue-green signals (suitably converted) from a color TV signal. The energy patterns that cause the exposure are preferably scanned laser beams directed onto the surfaces at approximately normal incidence. Three identical lasers 27A,27B,27C, with independent modulators 26A,26B,26C, scanning simultaneously, are preferable to one modulated laser that scans each group of surfaces in sequence.

Following exposure and a development, the photosensitive material that had been exposed becomes translucent, as at 50A and 50B in FIG. 7, and the unexposed material 41′ remains opaque. Holding the developed member to white light, it would generally appear gray with a hint of a washed out black and white image.

A full color image is produced by projecting three light beams 28A,28B,28C, each of a different primary color, through the developed member 30, at the three respective approximately orthogonal angles. The three light beams scatter from the respective area-modulated translucent patterns, providing a full color image. The color image is visible to the eye directly, or it can be projected onto a screen, or onto a color photographic paper 32 for production of hard copy prints. The developed member 30 may also be used as a master modulator in any of the various methods and apparatus of the present invention, to provide copies of itself for use in any of the above ways.

FIG. 12 illustrates typical embodiments in which the energy-modifiable materials 41A,41B are distributed, as by thermal diffusion, adjacent to the groups of surfaces 40A,40B, respectively. The materials 41A,41B are imbedded in a medium 53 that acts as a support and a protection from the environment.

A typical method according to the present invention for providing patterns of materials, comprises providing a support member 30 having a plurality of groups of surface areas 40A,40B, etc, with each surface area in a given group (e.g. 40A) facing generally in a predetermined direction that is different from the direction faced by the surface areas in any other group (e.g. 40B, etc), providing an energy-modifiable material 41A,41B, etc adjacent to the surface areas in each group and directing energy A,B,C onto the material 41A,41B, etc adjacent to the surface areas 40A,40B, etc in each group (e.g. 40A) in such manner as to substantially modify some of the material without substantially modifying the material adjacent to the surface areas of the other groups (e.g. 40B, etc).

The method may comprise also positioning a receiver member 32 with a surface 31 thereof adjacent to the groups of surface areas 40A,40B, etc, and transferring a substantial proportion either of the modified materials 41A,41B, etc or of the remaining unmodified materials 41A,41B, etc to the receiver surface 31 to form the desired patterns thereon. Or the method may include positioning the receiver member 32 with the surface 31 adjacent to the patterns of the modified materials 41A, 41B, etc, and directing electromagnetic radiation to the patterns, as in FIG. 1,8,9, or 10, in such manner as to be modulated thereby.

APPLICABILITY

In a typical embodiment of the invention, a color hard-copy printer for electronic imagery would use three independently modulated light beams to activate three primary colors, cyan, magenta, and yellow.

The beams would be scanned mechanically in a raster format, using a drum scanner. All three beams would activate the same pixel area simultaneously. Pixel information would be derived from the red, green, and blue signals from a color-graphic CRT display.

Dye sublimation would be the preferred color activation scheme. The light beams would be from either lasers or flash lamps, and the dyes would be either used alone or mixed with energy absorbing additives.

An alternative activation process is to use a photoelectric effect. The beam energy required is reduced by a factor of several hundred. In this process, pigment particles assume a charge when exposed to the light beam. By applying an electric field the charged particles are transferred to the receiver sheet.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. Apparatus for providing patterns of materials, comprising a support member having a plurality of groups of surface areas, with each surface area in a given group facing generally in a predetermined direction that is different from the direction faced by the surface areas in any other group, the surface areas in each group having an energy-modifiable material adjacent thereto, means for directing energy onto the material adjacent to the surface areas in each group in such manner as to substantially modify some of the material without substantially modifying the material adjacent to the surface areas of the other groups, and means for positioning a receiver member with a surface thereof adjacent to the groups of surface areas, so as to transfer a substantial proportion either of the modified materials or of the remaining unmodified materials to the receiver surface to form the desired patterns thereon.

2. Apparatus as in claim 1, wherein the material adjacent to the surface areas of one group differs from the material adjacent to the surface areas of another group.

3. Apparatus as in claim 1, wherein the material is substantially evenly distributed adjacent to the surface areas.

4. Apparatus as in claim 1, wherein the receiver member, at and adjacent to the surface areas, is substantially transparent to the energy, and the energy is directed through the receiver member onto the material.

5. Apparatus as in claim 1, wherein the support member, at and adjacent to the surface areas, is substantially transparent to the energy, and the energy is directed through the support member onto the material.

6. Apparatus as in claim 1, for providing patterns requiring treatment to give the desired final patterns, comprising also means for providing the required treatment.

7. Apparatus as in claim 1, for providing a latent image, and further comprising means for developing the image.

8. Apparatus as in claim 1, wherein the member has two groups of parallel surface areas forming an array of successive grooves, the right sides of the grooves being one group of surface areas, and the left sides of the grooves being the other group of surface areas.

9. Apparatus as in claim 1, wherein the member has three groups of surface areas approximately perpendicular to each other, forming an array of corners in rows and columns; each corner comprising three contiguous approximately perpendicular surface areas, one from each group, and approximating a corner of a cube; the first corresponding surface areas at the corners being parallel to one another and making up the first group, the second corresponding surface areas at the corners being parallel to one another and making up the second group, and the third corresponding surface areas at the corners being parallel to one another and making up the third group.

10. Apparatus as in claim 1, wherein the member has four groups of surface areas forming an array of corners in rows and columns; each corner comprising four contiguous surface areas, one from each group, and approximating the vertex of a square-based pyramid; the first corresponding surface areas at the corners being parallel to one another and making up the first group, the second corresponding surface areas at the corners being parallel to one another and making up the second group, the third corresponding surface areas at the corners being parallel to one another and making up the third group, and the fourth corresponding surface areas at the corners being parallel to one another and making up the fourth group.

11. Apparatus as in claim 1, wherein the surface areas comprise portions of conical, spherical, cylindrical, finned, vaned, or other depressed, protruding, or textured surfaces, regular or irregular; or combinations thereof; in regular or irregular disposition.

12. Apparatus as in claim 1, wherein the energy is spatially modulated to define the patterns of materials to be provided.

13. Apparatus as in claim 1, wherein the energy is directed onto all groups simultaneously.

14. Apparatus as in claim 1, wherein the energy is directed onto the groups in sequence.

15. Apparatus as in claim 1, wherein each point in the energy pattern is directed substantially simultaneously onto the surface areas of a group.

16. Apparatus as in claim 1, wherein the energy is directed onto the surface areas in beams or sheets that are scanned to cover a substantial part of the groups of surfaces.

17. Apparatus as in claim 16, wherein each beam or sheet of energy scans the surface areas of a different group.

18. Apparatus as in claim 16, wherein each beam or sheet of energy is modulated while it scans the surface areas.

19. Apparatus as in claim 1, wherein the energy directed onto the surface areas is a combination of beams, sheets, and/or patterns.

20. Apparatus as in claim 1, wherein the energy is directed onto the surface areas in each group in a direction predominantly normal thereto.

21. Apparatus as in claim 1, wherein the energy comprises light or other electromagnetic radiation.

22. Apparatus for providing patterns of materials, comprising a support member having a plurality of groups of surface areas, with each surface area in a given group facing generally in a predetermined direction that is different from the direction faced by the surface areas in any other group, the surface areas in each group having an energy-modifiable material adjacent thereto, and a laser or a flash tube for directing light or other electromagnetic radiation onto the material adjacent to the surface areas in each group in such manner as to substantially modify some of the material without substantially modifying the material adjacent to the surface areas of the other groups.

23. Apparaus for providing patterns of materials comprising a support member having a plurality of groups of surface areas, with each surface area in a given group facing generally in a predetermined direction that is different from the direction faced by the surface areas in any other group, the surface areas in each group having an energy-modifiable material adjacent thereto, and the material adjacent to the surface areas of one group differing from the material adjacent to the surface areas of another group, and means for directing energy onto the material adjacent to the surface areas in each group in such manner as to substantially modify some of the material with substantially modifying the material adjacent to the surface areas of the other groups, wherein the patterns form a color image and the materials comprise colorants, dyes, pigments, or precursors thereof.

24. Apparatus as in claim 23, wherein the materials comprise sublimable colorants, and the energy comprises electromagnetic radiation having wavelengths in the absorption bands of the materials, to sublimate the materials.

25. Apparatus as in claim 23, wherein each material comprises a sublimable colorant in contact with an energy absorbent, and the energy directing means provides radiation of a wavelength in the absorption band of the energy absorbent, to heat it and thus to sublimate the colorant.

26. Apparatus as in claim 23, wherein the energy-modifiable material is a colorant in contact with a chemical reagent, and the energy directing means stimulates a chemical reaction that alters the state of the colorant.

27. Apparatus as in claim 1, wherein the surface areas of all groups have the same material adjacent thereto.

28. Apparatus for providing patterns of materials, comprising a support member having a plurality of groups of surface areas, with each surface area in a given group facing generally in a predetermined direction that is different from the direction faced by the surface areas in any other group, the surface areas in each group having an energy-modifiable material adjacent thereto, and means for directing energy onto the material adjacent to the surface areas in each group in such manner as to the substantially modify some of the material without substantially modifying the material adjacent to the surface areas of the other groups, wherein the surface areas of all groups have the same material adjacent thereto, and wherein the patterns produced in the modified material are such as to be usable for subsequent modulation of energy.

29. Apparatus as in claim 28, comprising also means for directing electromagnetic radiation to the patterns, so as to be modulated thereby.

30. Apparatus as in claim 29, comprising also means for projecting images responsive to the modulated radiation.

31. Apparatus as in claim 30, comprising also a radiation sensitive member positioned to receive the projected images.

32. Apparatus as in claim 31, wherein the radiation comprises light, and the sensitive member comprises materials responsive thereto for providing images in a plurality of colors.

33. Apparatus as in claim 28, comprising also means for directing chemical reagents to the patterns, and wherein the patterns modulate the flow of the reagents to form images responsive thereto.

34. Apparatus as in claim 28, comprising also means for providing electric and/or magnetic fields in a region including the patterns, and wherein the patterns modulate the fields to form images responsive thereto.

35. A method for providing patterns of materials, comprising providing a support member having a plurality of groups of surface areas, with each surface area in a given group facing generally in a predetermined direction that is different from the direction faced by the surface areas in any other group, providing an energy-modifiable material adjacent to the surface areas in each group, directing energy onto the material adjacent to the surface areas in each group in such manner as to substantially modify some of the material without substantially modifying the material adjacent to the surface areas of the other groups, and positioning a receiver member with a surface thereof adjacent to the groups of surface areas, and transferring a substantial proportion either of the modified materials or of the remaining unmodified materials to the receiver surface to form the desired patterns thereon.

36. A method as in claim 35, wherein the energy either is spatially modulated to define the patterns of materials to be provided, with each point in the energy pattern directed substantially simultaneously onto the surface areas or a group, or is directed onto the surface areas in beams or sheets that are scanned to cover a substantial part of the groups of surfaces, with each beam or sheet of energy scanning the surface areas of a different group and being modulated while it scans the surface areas, or is directed onto the surface areas in a combination of beams, sheets, and/or patterns; wherein the energy either is directed onto all groups simultaneously or is directed onto the groups in sequence; and wherein the energy is directed onto the surface areas in each group in a direction predominantly normal thereto.

37. Apparatus for providing patterns of materials wherein treatment is required to give the desired final patterns, comprising a support member having a plurality of groups of surface areas, with each surface area in a given group facing generally in a predetermined direction that is different from the direction faced by the surface areas in any other groups, the surface areas in each group having an energy-modifiable material adjacent thereto, means for directing energy onto the material adjacent to the surface areas in each group in such manner as to substantially modify some of the material without substantially modifying the material adjacent to the surface areas of the other groups, and means for providing the required treatment.

38. Apparatus for providing patterns of materials, comprising support member having a plurality of groups of surface areas, with each surface area in a given group facing generally in a predetermined direction that is different from the direction faced by the surface areas in any other group, the surface areas in each group having an energy-modifiable material adjacent thereto, means for directing energy onto the material adjacent to the surface areas in each group in such manner as to substantially modify some of the material without substantially modifying the material adjacent to the surface areas of the other groups to provide a latent image, and means for developing the image.

* * * * *